2 Sheets—Sheet 1.

J. MIDDAUGH & C. M. WILCOX.

PORTABLE FENCE MACHINE.

No. 10,687. Reissued Feb. 9, 1886.

WITNESSES

Wm. H. Mortimer

L. W. Seeley

INVENTOR

Jacob Middaugh & Chas. M. Wilcox per Edw. Teale

Attorney

N. PETERS, Photo-Lithographer, Washington, D. C.

J. MIDDAUGH & C. M. WILCOX.

PORTABLE FENCE MACHINE.

No. 10,687. Reissued Feb. 9, 1886.

WITNESSES

Wm. H. Mortimer.

L. W. Seely

INVENTOR

Jacob Middaugh & Charles M. Wilcox per Geo. Teale

Attorney

N. PETERS, Photo-Lithographer, Washington, D. C.

UNITED STATES PATENT OFFICE.

JACOB MIDDAUGH AND CHARLES M. WILCOX, OF NEW PARIS, OHIO.

PORTABLE FENCE-MACHINE.

SPECIFICATION forming part of Reissued Letters Patent No. 10,687, dated February 9, 1886.

Original No. 309,724, dated December 23, 1884. Application for reissue filed November 12, 1885. Serial No. 182,628.

*To all whom it may concern:*

Be it known that we, JACOB MIDDAUGH and CHARLES M. WILCOX, both of New Paris, in the county of Preble and State of Ohio, have invented certain new and useful Improvements in Portable Fence-Machines; and we do hereby declare the following is a full, clear, and exact description of the invention, that will enable others skilled in the art to which it appertains to make and use the same, reference being had to the accompanying drawings, and to the letters of reference marked thereon, which form a part of this specification, and in which—

Figure 1:
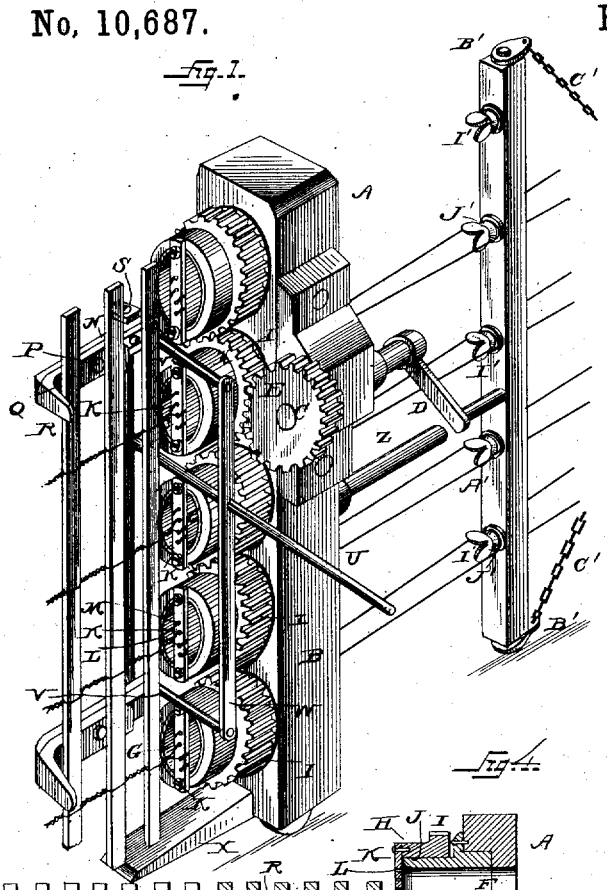
Figure 3:
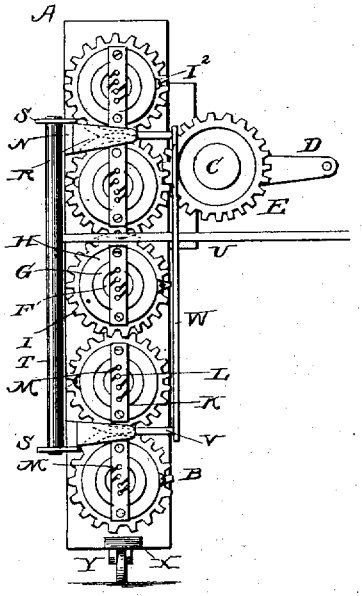
Figure 4:
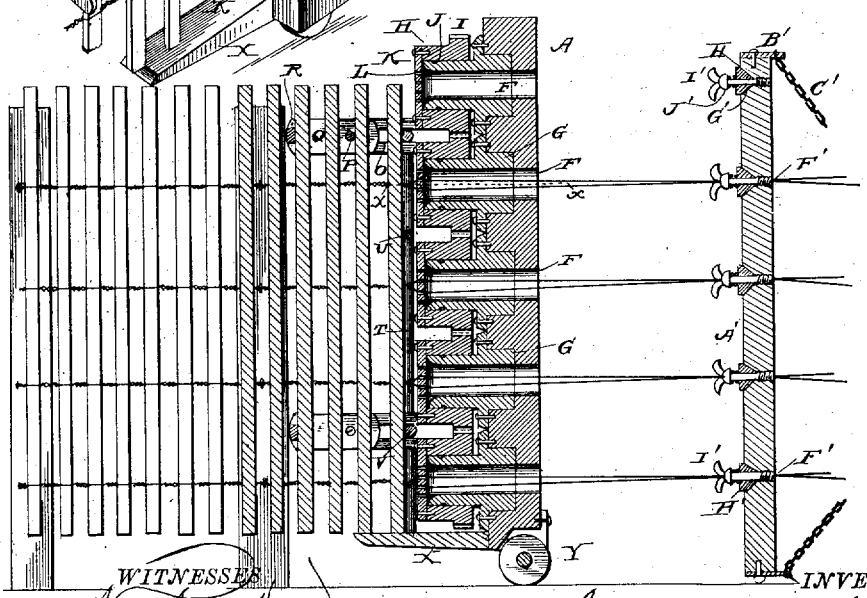
Figure 5:
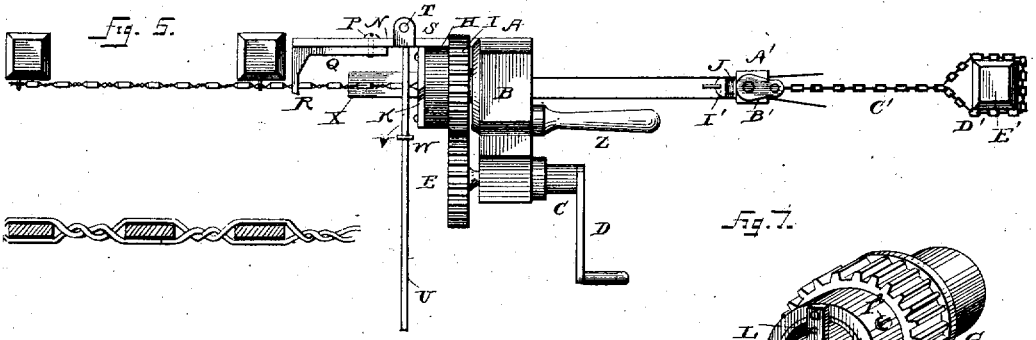
Figure 7:
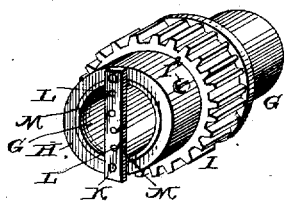
Figure 6:
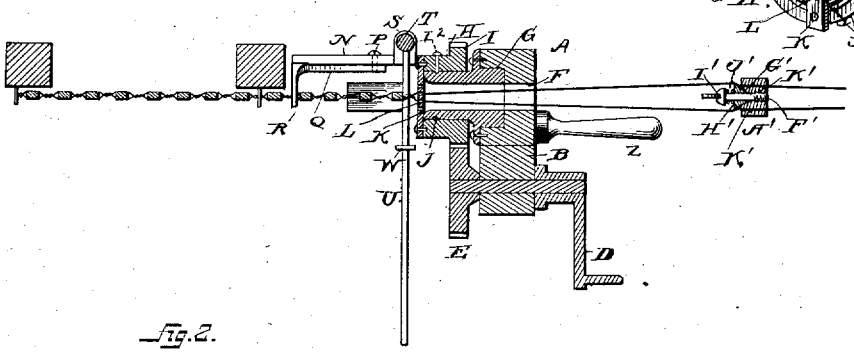
Figure 2:
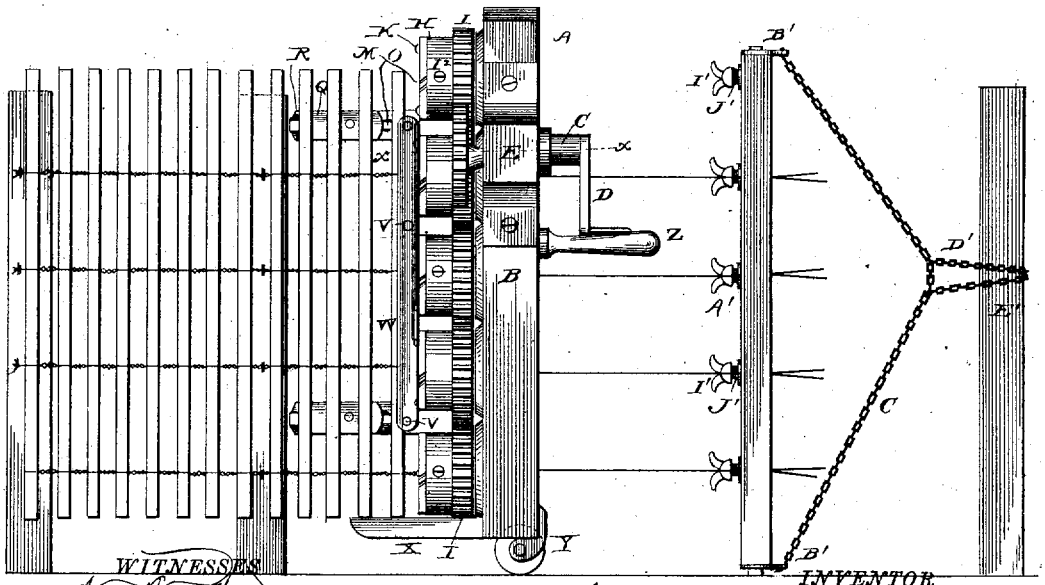

Figure 1 is a perspective view of our improved machine for building fences. Fig. 2 is a side view showing the same in position for operation. Fig. 3 is a front view of the machine. Fig. 4 is a vertical sectional view of the same and of the tension-bar in position for operation. Fig. 5 is a plan view of the machine in position for operation. Fig. 6 is a horizontal sectional view taken on the lines *x x* in Figs. 2 and 4, and Fig. 7 is a perspective detail view of one of the twisting wheels or disks.

The same letters refer to the same parts in all the figures.

This invention relates to machines for building or constructing that class of fences which are known as "wire and picket" fences, and which consist of pickets or palings connected by twisted or woven wire; and our invention has for its object to provide a machine of this character which shall possess superior advantages in point of simplicity, durability, and general efficiency, and which may be easily manipulated by any farm-hand for the purpose of constructing a fence in the desired position.

The invention comprises, essentially, a twisting device having an adjustable gage and a palings-tightener, and a tension device, through which the wires are fed to the twister.

The invention further consists in the improved construction and arrangement of details, which will be hereinafter fully described, and particularly pointed out in the claims.

In the drawings hereto annexed, A designates the twisting device, which comprises a frame-bar, B, one side of which is provided with a bearing for a transverse shaft, C, having an operating crank or handle, D, at its rear end, and provided at its front end with a spur-wheel, E. The frame-bar B is provided with a series of transverse openings, F F, provided with tubular spindles G G, upon which are mounted a series of wheels or disks, H H, the inner or rear ends of which are provided with teeth or gears I, meshing together, as shown. One of the said gear wheels or disks meshes with the spur-wheel E, so that by revolving the latter a rotary motion may be imparted to the entire series of disks H. The latter are retained in position upon their respective spindles by means of set-screws $I^2$, working in circumferential grooves J in the said spindles. Each of the disks H is provided upon its front side with a transverse bar or cross-piece, K, having a series of openings, L L, from which slits M extend to the edges of the said cross piece or bar. The wires are in practice to be threaded through two of the said openings which are equidistant from the center of the bar, and when desired—for instance, for the purpose of weaving in palings of a different size—the said wires may be removed from the openings in which they have been first placed through the slits M and adjusted in other openings without necessity for cutting the wires. It will also be noticed that the openings L are of sufficient size to admit of the passage of splices in the wires whenever they may occur. One side of the frame-bar B is provided near its upper and lower ends with forwardly-extending arms or brackets N N, which are provided with horizontal slots O to receive the set-screws P, by means of which the adjustable gage-plates Q are secured to the said arms or brackets. The said gage-plates consist simply of plates, the forward ends of which are provided with laterally-extending fingers R, the function of which will be presently made clear.

The arms or brackets N N are provided near their inner ends with lateral outwardly-extending lugs S S, forming bearings for the upper and lower ends of a vertical rock-shaft, T, having a handle, U, and arms V V, connected by a frame-bar, W.

The arms V and handle U constitute the tightening device, the operation of which will be presently explained.

The frame-bar B is provided near its lower end with a step, X, adapted to support the last paling inserted while it is being woven into the panel, thus causing all the palings to be set evenly as to height. The lower end of the frame-bar B is provided with a wheel or caster, Y, upon which it may be readily moved during the process of constructing the fence, and which will also serve as a pivot upon which the frame-bar may turn in a horizontal plane, and the rear side of the frame-bar is provided with a handle, Z, by means of which it may be conveniently manipulated.

A′ designates the tension-bar, which consists of a rod or bar of wood, metal, or other suitable material, of about the same length as the frame-bar B, and provided at its upper and lower ends with swiveled plates B′ B′, to which are attached the ends of a chain or rope, C′, which may during operation be suitably attached, by means of an additional rope or chain, D′, to a stake, post, or other fixed point, E′, which, as it should be in the line of the fence, may be one of the fence-posts. The tension-bar is provided with a series of screw-threaded perforations, F′ F′, registering with the openings F in the frame-bar B. The ends of the perforations F′ facing the said frame-bar are countersunk, as at G′, to receive the conical washers H′, which are retained in position by means of set-screws I′, between the heads of which and the said washers coiled springs J′ are interposed, for the purpose of supplying a yielding pressure, the tension of which may be regulated by tightening or loosening the said set-screws.

Adjoining each of the openings F′ in the bar A′ are formed two small orifices, K′, for the purpose of admitting the fence-wires. These orifices terminate in the countersinks G′, so that the wires shall pass under the conical washers H′, which latter may be adjusted in the manner described, so as to supply any degree of tension.

The operation of the invention is as follows: The wires, being unwound from the spools or coils in rear of the tension-bar, are first threaded through the perforations in the said tension-bar under the conical washers, which latter are at first so adjusted as to permit the wires to pass through freely. The ends of the wires are next passed through the perforations F and spindles G of the frame-bar B, and through the proper perforations of the cross-bar K of the twisting-disks H, after which they are suitably attached to the end post of the fence. The tension-bar is now suitably anchored to one of the fence-posts, or to some other fixed point, and the wires being drawn tight between it and the end post the set-screws I′ are adjusted to give the desired pressure. One of the pickets or palings is now adjusted between the wires and several turns given to the shaft C, carrying the spur-wheel E, whereby the several twisting-wheels are rotated and the wires twisted, so as to bind the paling securely in position. It will be noticed that the paling while being operated upon is supported by the step X of the frame-bar, and each paling operated upon is likewise supported, so that all will be set at an even height. The machine is now moved slightly back and another paling placed in position and tightened up against the first twist by means of the tightening-frame T U V W, which is simply swung or moved laterally by means of its handle, so as to force the paling up against the twist. The shaft C, carrying the spur-wheel E, is now turned several times in a direction opposite to that in which it was last turned, thus twisting the wires, so as to secure the paling, and at the same time untwisting the wires back of the machine. This operation is repeated until the first panel has been formed. The tension is then tightened and a few palings placed or woven in position so as to take up any slack from the first panel. The wires are then stapled to post No. 2, and the tension may afterward be readily adjusted so that the feed of wire shall be properly regulated. After a few palings or pickets have been placed in position the gage-plates Q are adjusted so that the fingers R shall rest against one of the said palings during operation. When the paling last operated upon has been secured, the machine is, by taking hold of the handle, swung horizontally, so as to release the fingers R, after which the machine is moved back until the said fingers shall engage the next paling, when the operation is repeated.

It is obvious that the gage-plates may be adjusted so as to leave any desired space between the palings.

This machine, as will be seen, is exceedingly simple in construction, and is therefore not liable to get out of order. It may be constructed at a moderate expense, and with it a durable and attractive fence may be constructed rapidly, easily, and at a small expense.

Having thus described our invention, we claim and desire to secure by Letters Patent of the United States—

1. A portable machine for constructing wire and picket fences, comprising a frame-bar mounted upon a single wheel or caster, and having a series of twisting-wheels geared together, and adapted to be operated by means of a spur-wheel meshing with one of the said twisting-wheels, substantially as and for the purpose set forth.

2. In a portable machine for constructing wire and picket fences, the combination, with a frame-bar having a series of tubular spindles, of a series of twisting-wheels geared together and mounted upon the said spindles, substantially as and for the purpose set forth.

3. In a portable fencing-machine, the combination, with a frame-bar having tubular spindles, of the twisting-wheels mounted upon the same and provided at their front ends with cross-bars having perforations or orifices, from which slits extend to the edges of the said bars, substantially as and for the purpose set forth.

4. In a portable fencing-machine, the combination of a frame-bar provided with tubular spindles, a series of twisting-wheels mounted upon the same and geared together, and a step arranged near the lower end of the said frame-bar, for the purpose of supporting the palings or pickets while being operated upon, substantially as set forth.

5. In a portable fencing-machine, the combination of a frame-bar having a series of twisting-wheels, and provided with forwardly-extending slotted arms, with gage-plates secured adjustably to the said arms and provided with laterally-extending fingers, substantially as and for the purpose set forth.

6. In a portable fencing-machine, the combination of a frame-bar having a series of twisting-wheels, and provided with forwardly-extending arms having laterally-extending lugs, with a rock-shaft mounted in the said lugs and having a suitable handle, and a pair of arms connected by a frame-bar, substantially as and for the purpose set forth.

7. In a portable fencing-machine, the herein-described frame-bar having a series of perforations and tubular spindles, the twisting-wheels mounted upon the same and geared together, a spur-wheel mounted upon a crank-shaft and meshing with one of the twisting-wheels, a step at the lower end of said frame-bar, arms extending forwardly from the said frame-bar and having adjustable gage-plates, and lugs supporting a pivoted tightening-frame, and a wheel or caster at the lower end of the said frame-bar, all arranged and operating substantially in the manner and for the purpose herein shown and specified.

8. In a portable fencing-machine, the combination, with the twisting apparatus constructed substantially as described, of a tension-bar provided at its upper and lower ends with swiveled plates connected by a rope or chain, whereby the said tension-bar may be connected securely to a fixed point during operation, substantially as and for the purpose set forth.

9. In a portable fencing-machine, the herein-described tension-bar having a series of screw-threaded perforations countersunk at their outer ends, smaller orifices adjoining the said perforations and terminating in the countersinks of the latter, conical washers fitting in the said countersinks, set-screws working in the screw-threaded perforations, and coiled springs interposed between the washers and the heads of the set-screws, substantially as and for the purpose set forth.

10. A portable fencing-machine comprising a twisting device having a series of twisting-wheels mounted upon tubular spindles, and constructed and meshed together as described, a supporting-step, an adjustable gage and a pivoted tightening-frame, and a tension-bar having countersunk perforations, conical washers, orifices for the passage of the fence-wires, tightening-screws, and springs bearing against the washers, all constructed, combined, and operating substantially in the manner and for the purposes herein shown and specified.

11. In a portable fencing-machine, the combination, with a fixed post and a vertical series of horizontal wires leading from a tension-post and secured to said fixed post, of a twister movable relatively to the fixed post and tension-post, and having a vertical series of twisting-heads geared together and operating on the wires between the post and the tension device, substantially as before set forth.

12. In a portable fencing-machine, the combination, with a series of spools or coils of wire, of a tension-bar secured at a fixed point during operation, and provided with adjustable tensions for controlling the movement of said wires, a fixed post to which the wires are attached in pairs, and a frame-bar having a series of twisting-wheels geared together and moving along said wires and guided thereby, substantially as set forth.

13. In a portable fence-machine, the combination of a fixed post, wire reels or spools, the tension-bar, the twister movable with relation to the fixed post and tension-bar and having a series of twisting-heads geared together, and the wires passing from the spools or coils first through the tension device, thence in pairs through the twisting-heads, and secured in pairs to the post, substantially as described.

14. A twisting-head for fence-machines, consisting, substantially as before set forth, of a tubular spindle, a twisting-wheel mounted to turn thereon, and a wire-holder upon the face of the twisting-wheel having open wire-holding notches or depressions arranged in pairs at different distances from the axial center of said wheel.

15. A twisting-head for fence-machines, consisting of a tubular spindle, a twisting-wheel mounted to rotate thereon, and a wire-holder upon the face of the twisting-wheel having two or more wire-holding notches or devices, substantially as set forth.

In testimony whereof we affix our signatures in presence of two witnesses.

JACOB MIDDAUGH.
CHARLES M. WILCOX.

Witnesses:
I. C. DOANE,
ACHILLES BALLARD.